March 23, 1954     N. E. ANDERSON     2,673,278
METHOD OF ELECTRIC WELDING
Original Filed July 30, 1948     2 Sheets-Sheet 1
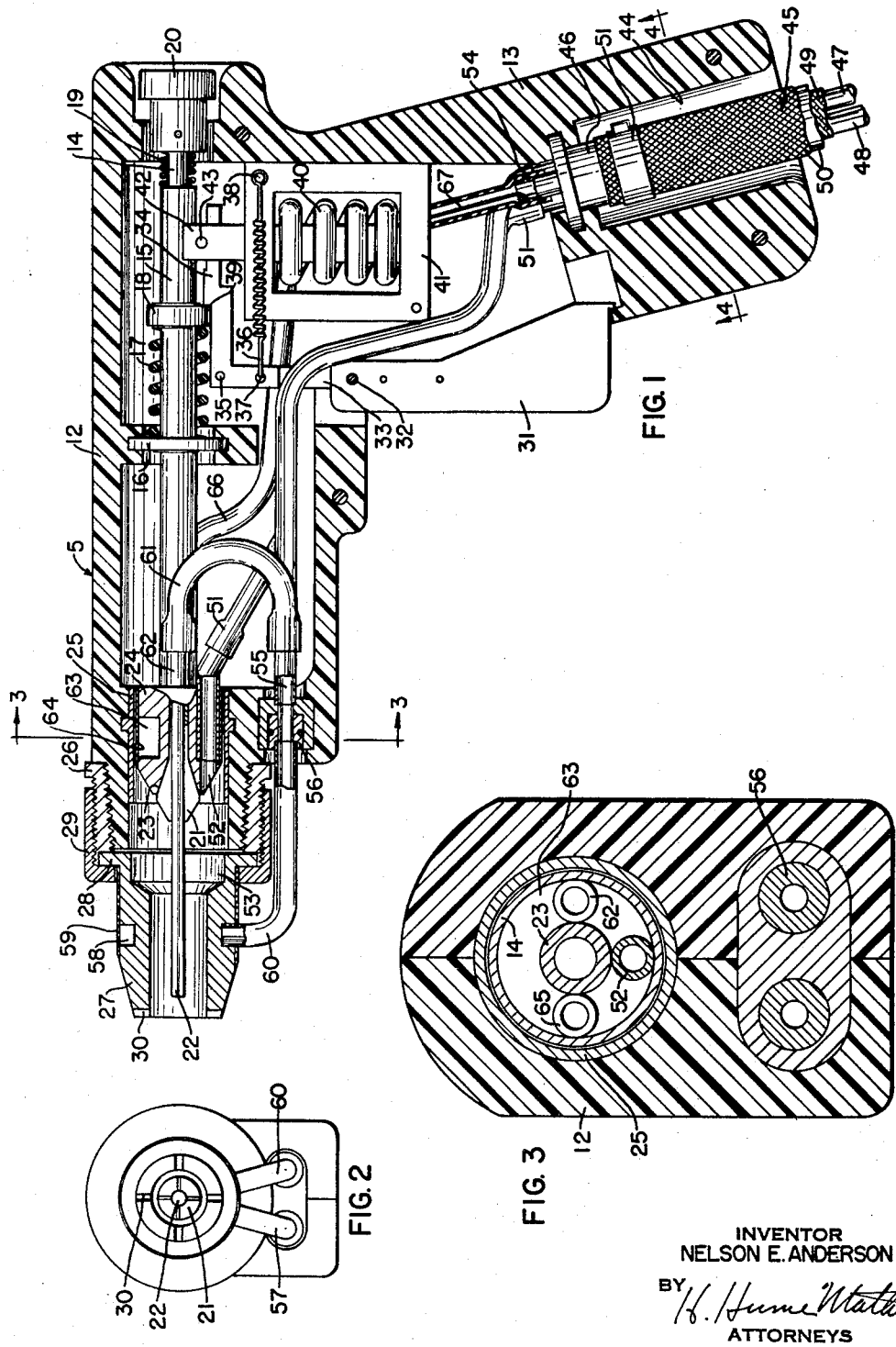
INVENTOR
NELSON E. ANDERSON
BY
ATTORNEYS March 23, 1954 N. E. ANDERSON 2,673,278
METHOD OF ELECTRIC WELDING
Original Filed July 30, 1948 2 Sheets-Sheet 2

INVENTOR
NELSON E. ANDERSON
BY
ATTORNEYS

Patented Mar. 23, 1954

2,673,278

UNITED STATES PATENT OFFICE 2,673,278

METHOD OF ELECTRIC WELDING

Nelson E. Anderson, Berkeley Heights, N. J., assignor to Air Reduction Company, Incorporated, a corporation of New York Original application July 30, 1948, Serial No. 41,257, now Patent No. 2,586,140, dated February 19, 1952. Divided and this application June 7, 1951, Serial No. 230,335

The portion of the term of the patent subsequent to February 19, 1969, has been disclaimed 2 Claims. (Cl. 219—10)

This application is a division of my copending application, Serial No. 41,527, filed July 30, 1948, now Patent No. 2,586,140.

This invention relates to electric welding and more particularly to a method of welding and apparatus therefor.

Electric welding is widely used for many purposes, but the methods and apparatus in use have certain limitations. Among these are the difficulties encountered in spot welding, which has been accomplished heretofore only by resistance welding methods. The electric arc method, that is the application of an arc struck between the workpiece and an electrode, has not been adapted heretofore for joining metals by spot welding.

It is the object of the present invention to provide a method of spot welding metals in an economical and practical manner.

Another object of the invention is the provision of arc welding employing D. C. current, in which the operation is started by touching the workpiece with the electrode and immediately withdrawing the electrode to strike the arc.

A further object of the invention is the provision of a convenient and easily handled apparatus for applying the electric arc in spot welding metals.

Another object of the invention is the provision of an apparatus for spot welding in which the electrode and workpiece are shielded by an inert gas to prevent oxidation and other defects in the welds.

Other objects and advantages of the invention will be apparent as it is better understood by reference to the following specification and accompanying drawing, in which:

Fig. 1 is a longitudinal section through an apparatus adapted for the practice of the invention;

Fig. 2 is a front elevation of the apparatus;

Fig. 3 is an enlarged section on the line 3—3 of Fig. 1;

Figure 4:
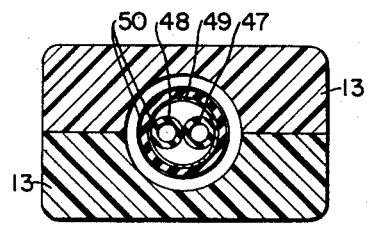
Fig. 4 is a section on the line 4—4 of Fig. 1.
Figure 5:
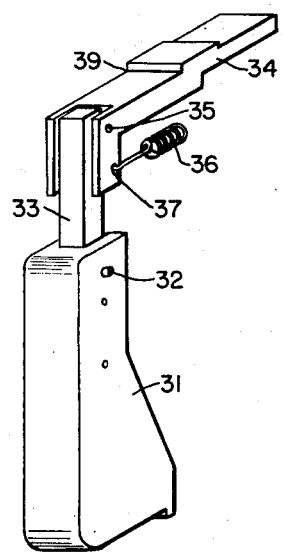
Fig. 5 is a detail in perspective illustrating the trigger mechanism of the apparatus.
Figure 6:
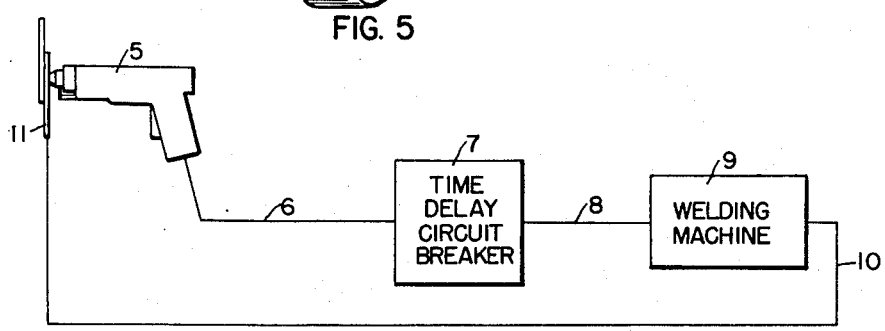
Fig. 6 is a diagrammatic illustration of the apparatus in use.

The invention is applicable primarily to the spot welding of sheet metal to secure the sheets to each other. In the operation of the method, the parts to be joined are first assembled and clamped in proper position. The electrode, preferably a non-consuming electrode such as tungsten or the like, is then brought into contact with one face of the workpiece and is immediately withdrawn to establish an arc which is maintained for a sufficient period to ensure suitable penetration and the melting of the metal of the parts to be joined so that a weld is formed. The arc is then broken, and the electrode is moved to a point at some distance from the original weld, where the operation is repeated. As many spot welds may be made as is necessary to secure the parts together. In accordance with the invention, an inert gas such as helium, argon or the like is supplied continuously to surround the electrode and blanket the weld, thereby preventing the entrance of oxygen and nitrogen of the atmosphere and ensuring the production of a sound weld at each point where the arc is struck with the workpiece. The method of operation is illustrated in Fig. 6 of the drawing, in which 5 indicates a welding gun which is connected by a conductor 6 to a time delay circuit breaker 7. The latter device forms no part of the present invention and is merely a safety device to prevent the maintenance of the arc for excessive periods. The device 7 is connected by a conductor 8 to a welding machine 9 which may be a D. C. welding generator. The other pole of the generator is connected by a conductor 10 to the workpiece 11 which, as illustrated, consists of two sheets or plates which are to be joined by spot welding.

The welding gun 5 consists of a barrel 12 and a pistol grip 13 which may be made of plastic, vulcanized rubber, or other suitable material. Within the barrel 12, a tube 14 is slidably disposed in a sleeve 15 which is also movable longitudinally in the barrel, being mounted in a ring 16 which is secured in the barrel. A spring 17 is disposed between the ring 16 and a flange 18 on the sleeve 15 and normally biases the sleeve rearwardly in the barrel. A weaker spring 19 is disposed between the end of the sleeve 15 and a knob 20 on the end of the tube 14.

At its forward end, the tube 14 is enlarged at 21, and the enlarged end is split to afford four fingers which are adapted to grip the electrode 22. The enlarged end 21 is provided with a conical surface 23 which engages a similar surface on the end of a collar 24 which is secured to the sleeve 15. The enlarged end 21, in co-operation with the collar 24, affords a chuck adapted to grip the electrode 22. To release the electrode for adjustment, it is necessary merely to push the knob 20 inwardly against the tension of the spring 19. This releases the gripping fingers, which are normally held in the position indicated in Fig. 1 by the spring 19. A sleeve 25, secured within the barrel 12, ensures alignment of the collar 24 and permits sliding movement of the collar and the sleeve 15.

At the end of the barrel 12, a collar 26, threaded internally and externally, is mounted on the barrel. A nozzle 27, having a flange 28, is secured to the end of the barrel by a nut 29 which engages the threads of the collar 26. The nozzle 27 is made of suitable metal adapted to withstand the heat of the arc and is provided at its end with slots 30 which permit the inert gas, supplied as hereinafter described, to spread laterally about the arc formed between the electrode 22 and the workpiece 11, thus ensuring maximum shielding and protection of the weld.

A trigger 31 is pivotally mounted at 32 on the barrel 12 and operates in a recess provided for that purpose in the pistol grip 13. An arm 33 is connected to the trigger 31 and movable therewith. A latching member 34 is pivotally connected to the arm 33 at 35. A spring 36 is secured to the latch member 34 at 37 and to a pin 38, so that the latch member is normally held in the position indicated in Fig. 1, in engagement with the flange 18 on the sleeve 15. When the trigger 31 is pulled inwardly, the shoulder 39 on the latch member is moved forwardly, carrying the sleeve 15 with it, and the electrode 22 is thus projected through the opening in the end of the nozzle 27 to engage the workpiece 11. This closes the circuit, with the result that current flows through a conductor in a coil 40, connected in series with the electrode holder and disposed in a magnetic frame 41 forming a solenoid. As soon as the current flows, the armature 42, having a pin 43 engaging the latch member 34, is drawn downwardly, thus releasing the flange 18. Thereupon the sleeve 15 is moved rearwardly by the spring 17 and the arc is established between the electrode 22 and the workpiece. The end of the nozzle 27 is held against the workpiece until the weld is completed. It is then withdrawn and the operation is repeated to produce the next weld.

A recess 44 is provided in the butt of the pistol grip 13 to receive a flexible cable 45 which is secured to a connecting fitting 46. The cable is preferably of the type illustrated and described in the application of Anderson and Sullivan, Ser. No. 782,898 filed April 29, 1947, for Electric Cable for Welding Equipment, now Patent No. 2,535,187. It consists of flexible tubes 47 and 48, preferably twisted and surrounded by a braided conductor 49, which carries the current. The conductor is in turn surrounded by a sleeve 50 of suitable material such as rubber or flexible plastic, which is secured to the fitting 46 by a clamp 51. The tubing 48 carries the inert gas which is delivered from the fitting 46 through flexible tubing 51' to a tube 52 which extends through the collar 24 into the chamber 53 which surrounds the electrode 22. The gas is thus delivered to the space surrounding the arc in order to maintain the desired shielding effect.

Water is delivered through the tube 47 and is carried from the fitting 46 through tubing 54 to a pipe 55 and thence through a water-tight connection 56 to a pipe 57 leading to a cooling chamber 58 in the nozzle 27. The chamber 58 is closed by a ferrule 59. The water returns through a pipe 60 to the water-tight connection 56, thence through a flexible tube 61 to a tube 62, which delivers the water to a space 63 in the collar 24 which is closed by a ferrule 64. The water returns through a pipe 65 and flexible tube 66, and flows through the casing 50 about the braided conductor 49, thus cooling the cable.

Current is supplied through the braided conductor 49 to the fitting 46 to which a wire 67 is connected. The wire 67 passes through the flexible tube 66 to the collar 24 and thence to the electrode 22. As already indicated, the wire 67 is disposed within the coil 40, thus ensuring release of the latch 34 as soon as the electrode 22 touches the workpiece.

The apparatus as described affords an extremely handy mechanism for conducting the welding operation. The operator, grasping the pistol grip 13, places the end of the nozzle against the workpiece and operates the trigger 31 to advance the electrode 22. As soon as the electrode 22 touches the work, it is released and returned by the spring 17 so as to provide a gap and the production of the welding arc. In one-half to two seconds, the arc penetrates the workpiece and securely welds the parts thereof together at the point where the arc is formed. A series of such arcs produced at spaced points along the workpiece completes the welding operation. Meanwhile, the shielding gas eliminates the effect of the atmosphere on the weld. The circulating cooling water maintains the tip 27 and the collar 24 at a relatively low temperature, thereby preventing injury to the apparatus. The arc, when formed, is enclosed within the nozzle 27, and the operator is protected from heat and the glare of the arc.

Various changes may be made in the details of the apparatus as described and in the operation of the method, without departing from the invention or sacrificing the advantages thereof.

I claim:

1. In a method of electrically welding a workpiece with a welding tool having an electrode supported within a gas nozzle for movement toward and away from a workpiece to be welded, said electrode being biased in a direction away from said work, the steps which comprise placing the gas discharge end of said nozzle in contact with said workpiece so that it substantially surrounds a selected spot on the surface of said workpiece, flowing a shielding gas through said nozzle onto said surface spot to exclude air therefrom, advancing said electrode against said biasing force into electrical contact with said surface spot to initiate the flow of an arc welding current between said electrode and said workpiece, releasing said electrode in response to the initiation of flow of said welding current to enable said biasing force to retract said electrode from said surface spot to create a gas shielded welding arc within said nozzle between said electrode and said workpiece, and terminating the flow of said arc welding current to extinguish said arc at the end of a selected time interval following initiation of said arc.

2. A method according to claim 1, for spot welding a plurality of workpieces together, wherein a portion of one of said workpieces is superposed on a portion of another of said workpieces to provide overlapping surfaces forming a lap joint to be welded, and in which said gas nozzle is pressed against a selected surface spot on one of said workpieces overlying said lap joint, said arc being maintained a predetermined length of time sufficient to form a weld between said superposed workpiece portions in the area of said lap joint underlying the surface spot upon which said nozzle is pressed.

NELSON E. ANDERSON.

References Cited in the file of this patent

UNITED STATES PATENTS

| Number | Name | Date |
|---|---|---|
| 363,320 | Bernardos | May 17, 1887 |
| 2,191,494 | Nelson | Feb. 27, 1940 |
| 2,315,502 | Crecca | Apr. 6, 1943 |
| 2,468,807 | Herbst | May 3, 1949 |
| 2,550,495 | Pilia | Apr. 24, 1951 |